(12) United States Patent
Stravers et al.

(10) Patent No.: US 11,564,343 B2
(45) Date of Patent: Jan. 31, 2023

(54) METHOD FOR OPERATING A USER TERMINAL OF AN AGRICULTURAL MACHINE AND AGRICULTURAL MACHINE

(71) Applicant: Kverneland Group Mechatronics B.V., Nieuw-Vennep (NL)

(72) Inventors: Thomas Jeroen Stravers, Nieuw Vennep (NL); Ivar Jacobus Gerardus In't Veen, Berkel en Rodenrijs (NL)

(73) Assignee: KVERNELAND GROUP MECHATRONICS B.V., Nieuw-Vennep (NL)

( * ) Notice: Subject to any disclaimer, the term of this patent is extended or adjusted under 35 U.S.C. 154(b) by 326 days.

(21) Appl. No.: 16/650,202

(22) PCT Filed: Jul. 26, 2018

(86) PCT No.: PCT/EP2018/070282
§ 371 (c)(1),
(2) Date: Mar. 24, 2020

(87) PCT Pub. No.: WO2019/025277
PCT Pub. Date: Feb. 7, 2019

(65) Prior Publication Data
US 2020/0305337 A1    Oct. 1, 2020

(30) Foreign Application Priority Data

Aug. 1, 2017    (EP) ..................................... 17184318

(51) Int. Cl.
*G08G 7/00*      (2006.01)
*A01B 76/00*      (2006.01)
(Continued)

(52) U.S. Cl.
CPC .............. *A01B 76/00* (2013.01); *B60K 35/00* (2013.01); *G05B 19/0426* (2013.01);
(Continued)

(58) Field of Classification Search
CPC ........ A01B 76/00; A01B 71/02; B60K 35/00; B60K 2370/152; B60K 2370/33;
(Continued)

(56) References Cited

U.S. PATENT DOCUMENTS 10,813,269 B2 * 10/2020 Blunier ................ F15B 21/082
11,205,337 B1 * 12/2021 Derscheid .......... G06K 19/0723
(Continued)

FOREIGN PATENT DOCUMENTS

| EP | 2821864 A1 | 1/2015 |
|---|---|---|
| RU | 2152147 C1 | 7/2000 |
| RU | 2527759 C2 | 9/2014 |

OTHER PUBLICATIONS

International Search Report issued in connection with PCT Application No. PCT/EP2018/070282 dated Oct. 9, 2018.
(Continued)

*Primary Examiner* — Toan N Pham
(74) *Attorney, Agent, or Firm* — Dennemeyer & Associates, LLC

(57) ABSTRACT

The present disclosure refers to a method for operating a user terminal (7) of an agricultural machine, comprising providing a user terminal (7) in a control system (3) of an agricultural machine, the user terminal (7) connected to a power supply and configured to transmit, through a control bus (6), control signals to functional elements (10*a*; 10*b*) of the agricultural machine; enabling operation of the user terminal (7), after a period of time the user terminal was turned-off before, comprising enabling a user control mode of operation of the user terminal (7); running software applications in the user terminal (7); enabling a display device of the user terminal (7); and enabling the control bus (6), thereby, operating the control bus (6) in a bus control mode allowing for transmission of the control signals through the control bus (6); controlling operation of one of the functional elements (10*a*; 10*b*) of the agricultural machine in the user control mode of operation; in response to a user input, generating present control signals; transmitting the present control signals to the control unit assigned to the one of the functional elements (10*a*; 10*b*) through the (Continued)

control bus (6); and operating the functional elements (10a; 10b) according to the present control signals; disabling the user control mode of operation and enabling a standby mode of operation for the user terminal (7), comprising continuing with running one or all of the software applications in the user terminal (7); disabling the display device of the user terminal (7); and disabling the control bus (6); and re-enabling the control mode of operation for the user terminal (7). Further, an agricultural machine is provided.

9 Claims, 6 Drawing Sheets

(51) Int. Cl.
*B60K 35/00* (2006.01)
*G05B 19/042* (2006.01)

(52) U.S. Cl.
CPC .... *B60K 2370/152* (2019.05); *B60K 2370/33* (2019.05); *G05B 2219/23316* (2013.01); *G05B 2219/45017* (2013.01)

(58) Field of Classification Search
CPC ...... G05B 19/0426; G05B 2219/23316; G05B 2219/45017; G06F 9/4418
See application file for complete search history.

(56) References Cited

U.S. PATENT DOCUMENTS

| | | |
|---|---|---|
| 2012/0173038 A1 | 7/2012 | Davis et al. |
| 2014/0172128 A1* | 6/2014 | Johnson ................ G07C 5/008 700/83 |
| 2014/0229727 A1 | 8/2014 | Jun |
| 2015/0217790 A1 | 8/2015 | Golden et al. |
| 2015/0366124 A1 | 12/2015 | Kremmer et al. |

OTHER PUBLICATIONS

India Examination report in connection to Application No. 202017008692 dated Apr. 3, 2022.
Russia Examination report in connection to Application No. 2020108783/28( 014351) dated Feb. 25, 2022.

* cited by examiner

METHOD FOR OPERATING A USER TERMINAL OF AN AGRICULTURAL MACHINE AND AGRICULTURAL MACHINE

CROSS-REFERENCE TO RELATED APPLICATIONS

This is a 35 U.S.C. 371 National Stage Patent Application of International Application No. PCT/EP2018/070282, filed Jul. 26, 2018, which claims priority to European application 17184318.8, filed Aug. 1, 2017, each of which is hereby incorporated by reference in its entirety.

The present disclosure refers to a method for operating a user terminal of an agricultural machine and agricultural machine.

BACKGROUND

User terminals are provided as a user interface for receiving user input for controlling operation of functional elements of an agricultural machine. For example, in an agricultural machine comprising a tractor and an implement trailed by or carried on the tractor the user terminal may be located in the tractor. The user terminal is provided with hardware and software components including, for example, a touch-sensitive display, and additional input devices such as a rotatable control knob or a joystick. The user terminal is connected to a control system of the agricultural machine. In response to receiving user input through the user terminal, control signals are generated for controlling operation of functional elements of the tractor and/or the implement, the functional elements being connected to a control bus used for transmitting the control signals to the functional components. A local control unit may be assigned to one or more of the functional elements, the local control unit being connected to the data bus for control signals transmission.

After ignition of the engine of the agricultural machine, there is a booting process for starting the user terminal and enabling a mode of operation for the user terminal which allows for receiving user input.

Document US 2015/0366124 A1 discloses an arrangement for the control of a device interface of an agricultural work vehicle includes a control unit of the work vehicle, which is connected, in a controlling manner, with an external power actuator for the adjustment of the position of the device interface, and a portable computer with input and a processor which has a wireless communication connection with the control unit and on which software was downloaded, which makes possible control of the actuator by the input, via the processor and the control unit.

SUMMARY

It is an object of the present disclosure to provide a method for operating a user terminal of an agricultural machine and an agricultural machine which allow for improved operation of the user terminal depending on the different use scenarios in field operation.

For solving the problem, a method for operating a user terminal of an agricultural machine and an agricultural machine according to the independent claim is provided. Alternative embodiments are the subject of dependent claims.

According to an aspect, a method for operating a user terminal of an agricultural machine is provided. The method comprises providing a user terminal in a control system of an agricultural machine, the user terminal connected to a power supply and configured to transmit, through a control bus, control signals to functional elements of the agricultural machine; and enabling operation of the user terminal, after a period of time the user terminal was turned-off before. The enabling of the operation of the user terminal is comprising the following: enabling a user control mode for operation of the user terminal; running software applications in the user terminal; enabling a display device of the user terminal; and enabling the control bus, thereby, operating the control bus in a bus control mode allowing for transmission of the control signals through the control bus. The operation of one of the functional elements of the agricultural machine is controlled in the user control mode of operation, the controlling comprising the following: receiving a user input for controlling operation of the one of the functional elements through an input device of the user terminal; in response to the user input, generating present control signals; transmitting the present control signals to the control unit assigned to the one of the functional elements through the control bus; and operating the functional elements according to the present control signals. The user control mode of operation is disabled, and a standby mode of operation for the user terminal is enabled, such enabling comprising: continuing with running one or all of the software applications in the user terminal; disabling the display device of the user terminal; and disabling the control bus, thereby, preventing transmission of the control signals from the user terminal through the control bus. Following, the control mode of operation is re-enabled for the user terminal.

According to further aspect, an agricultural machine is provided, comprising a control system, a user terminal provided in the control system and connected to a power supply, functional control elements, and a control bus provided in the control system and configured to transmit control signals from the user terminal to the functional elements, wherein the user control system is configured to operate the user terminal according to the method.

Having the different modes of operation for the user terminal implemented will allow for improved operation of the control system of the agricultural machine, specifically with regard to the user terminal. Depending on a present working scenario, the ignition device of the agricultural machine may be turned on or off. During operation of the agricultural machine on the field, there may be switching between the turning on and turning off state of the ignition device. In case of determining the turn-off state of the ignition device, the standby mode of operation is enabled for the user terminal, the standby mode of operation providing reduced or limited functionality compared to the control mode of operation. However, there are one or more software applications in the user terminal still running in the standby mode. For returning to the control mode of operation, this will allow for easier re-activation of the additional functionality of the user terminal shut off in the standby mode.

Depending on the present use scenario for the agricultural machine there is switching between the control mode of operation and the standby mode of operation.

The method may further comprise: determining a turn-on state of an ignition device of the agricultural machine in the control system; enabling operation of the user terminal within a starting time after determining the turn-on state; determining a turn-off state of the ignition device of the agricultural machine; and in response to the determining of the turn-off state, disabling the control mode of operation and enabling the standby mode of operation for the user terminal.

The enabling of operation may comprise enabling of the operation of the user terminal within a starting period of time after determining the turn-on state, and the re-enabling of the control mode of operation may comprise re-enabling the control mode of operation for the user terminal within a re-starting period of time after determining a re-turn-on state of the ignition device, the re-starting period of time being shorter than the starting period of time.

The re-starting period of time may be shorter than the starting period of time by at least 70%. In an alternative embodiment, the re-starting period of time may be shorter than the starting period of time by at least about 80%.

The enabling of the standby mode of operation for the user terminal may comprise disabling an input device of the user terminal. For example, at least one of a touch sensitive input device provided on the display of the user terminal and an external input device may be disabled, thereby, preventing user input.

The disabling of the control bus may comprise, within an OSI (Open System Interconnection) layer model of the control bus, disabling control signal or message transmission from a data link layer to a physical layer. The control bus may be provided as a CAN bus (Controller Area Network protocol). In an embodiment, the control bus, according to the OSI model, may be implemented with the physical layer, the data link layer, and an application layer. The physical layer may provide for basic hardware required for a control bus network, such as a CAN bus network, i.e. the ISO 11898 electrical specification. The data link layer may be responsible for transferring messages/signals from a node to the network (without errors). The application layer may provide for upper-level communication functions of the OSI layer model. In general, although the other layers may be implemented by software and/or hardware, the physical layer is implemented by hardware. In the standby mode of operation for the user terminal, by the disabling control signal transmission from the user terminal to one of the functional elements is prevented. Specifically, the user is prevented from control input. Signal transmission between the functional elements through the control bus may still be enabled. In such alternative embodiments, nodes of the control system connected to the control bus other than the user terminal may be provided with the signal transmission functionality of the control bus.

The disabling of the display may comprise one of outputting a standby screen on the display device of the user terminal, and turning-off a backlight illumination of the display device of the user terminal. The standby screen may be a black image presented on the display device. The display device may be provided with a liquid crystal display. In the standby mode of operation any (further) updating of content displayed on the display device may be prevented.

In the standby mode of operation, the method may further comprise: determining a standby time in the control system, the standby time indicating a period of time lapsed after the enabling of the standby mode of operation for the user terminal; determining that the standby time is exceeding a standby time limit; and, in response to the determining, turning-off the user terminal. The standby time limit, for example, may be about 12 h.

The providing may comprise providing the user terminal in a tractor of the agricultural machine, the tractor trailing or carrying an implement, wherein at least some of the functional elements are provided on the implement. The implement may be selected, for example, from the following group: loader wagon, sprayer, baler, rake, and mower.

In an alternative embodiment, a method for operating a user terminal of an agricultural machine, the method comprising
providing a user terminal in a control system of an agricultural machine, the user terminal connected to a power supply and, through a control bus configured to transmit control signals to the functional elements of the agricultural machine;
applying a supply power, through a supply line, to the user terminal with a voltage level provided by the power supply, the voltage level being an normal operation voltage level;
determining at least one of a turn-on state of an ignition device of the agricultural ma-chine and a drop of the supply power provided by the power supply in the supply line to a reduced voltage level which is smaller than an minimum operation voltage level, the minimum operation voltage level being equal to or smaller than the normal operation voltage level and the drop of the supply power being caused by the ignition device switching into the turn-on state;
in response to the determining, boosting the reduced voltage level to a boosted voltage level by a voltage upscaling device connected to the supply line, the boosted voltage level reaching at least the minimum operation voltage level;
operating, while the ignition device is in the turn-on state, the user terminal with the power supply having the boosted voltage level;
determining at least one of a turn-off state of the ignition device and termination of the drop of the supply power provided by the power supply in the supply line, the termination of the drop being caused by the ignition device switching into the turn-off state;
in response to the determining, terminating the boosting of the reduced voltage level; and
applying the supply power, through a supply line, to the user terminal with the voltage level provided by the power supply, the voltage level being the normal operation voltage level.

In the method, the operating of the user terminal, while the ignition device is in the turn-on state, may comprise: enabling a user control mode of operation of the user terminal; running software applications in the user terminal; enabling a display device of the user terminal; and enabling the control bus, thereby, operating the control bus in a bus control mode allowing for transmission of the control signals through the control bus.

In the method, the operating of the user terminal may comprise controlling operation of one of the functional elements of the agricultural machine in the user control mode of operation. The controlling may comprise: receiving a user input for controlling operation of the one of the functional elements through an input device of the user terminal; in response to the user input, generating present control signals; transmitting the present control signals to the control unit assigned to the one of the functional elements through the control bus; and operating the functional elements according to the present control signals. In the method, the operating of the user terminal, while the ignition device is in the turn-off state, may comprise enabling a standby mode of operation for the user terminal. The enabling may comprise: continuing with running one or all of the software applications in the user terminal; disabling the display device of the user terminal; and disabling the control bus, thereby, preventing transmission of the control signals from the user terminal through the control bus.

In the method, the operating of the user terminal may comprise disabling the control mode of operation and enabling the standby mode of operation for the user terminal in response to the determining of the turn-off state.

In the method, the operating of the user terminal, while the ignition device is in the turn-on state, may comprise re-enabling the control mode of operation for the user terminal.

The method may further comprise preventing the user terminal, while the ignition device is in the turn-on state, from at least one of switching to a turn-off stat and re-booting.

The method may further comprise providing the voltage upscaling device in the user terminal.

In the method, the boosting may comprise boosting a reduced voltage level of about 2 to 4 V to a boosted voltage level of about 10 to 12 V. In general, in the alternative embodiments DC voltage may be upscaled.

In an alternative embodiment, an agricultural machine may be provided, comprising: a control system; a user terminal provided in the control system; a power supply connected to the user terminal through a supply line; a voltage upscaling device connected to the supply line; functional control elements; and a control bus provided in the control system and configured to transmit control signals from the user terminal to the functional elements; wherein the user control system is configured to operate the user terminal according to the above method.

With regard to the agricultural machine, the alternative embodiments described for the method for operating above may apply mutatis mutandis.

Each of the functional elements may be assigned an electronic control unit which is connected to the data or control bus for receiving (and/or sending) electronic signals such as control signals. A single electronic control unit may be assigned to more than one functional element. The electronic control units each may provide for a node connected to the control bus.

BRIEF DESCRIPTION OF THE DRAWINGS

Following, further embodiments are described in detail with reference to figures. In the figures, show.

DETAILED DESCRIPTION OF THE DRAWINGS

Figure 1:
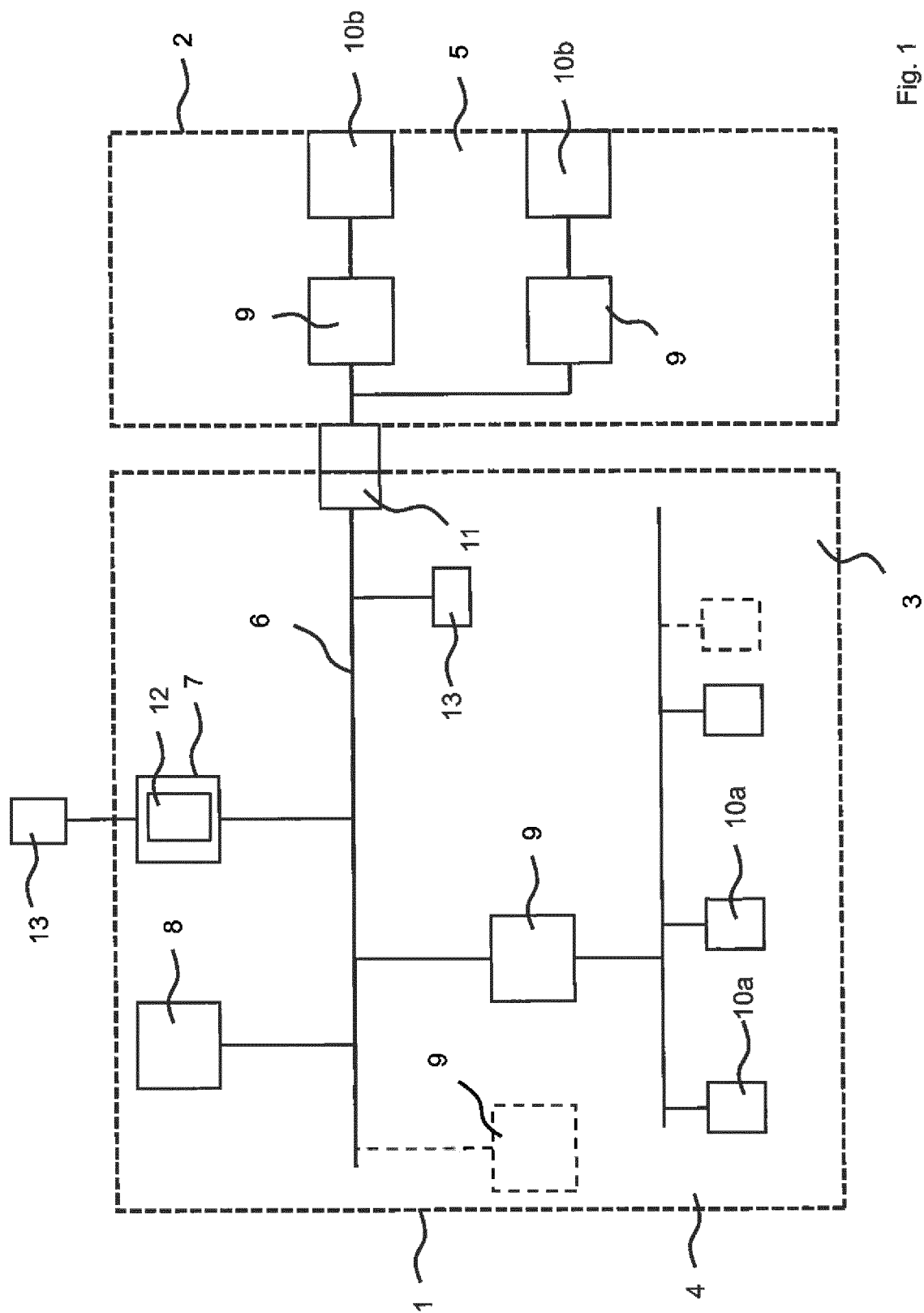
FIG. 1 a schematic representation of a control system of an agricultural machine or system provided with a tractor and an implement trailed by or carried on the tractor.

FIG. 1 shows a schematic representation of an agricultural machine or system having a tractor 1 and an implement 2 trailed by or carried on the tractor 1.

An agricultural machine control network 3 provides for an electronic control system of the agricultural machine or system. The agricultural machine control network 3 comprises a tractor control network 4 and an implement control network 5. The agricultural machine control network 3 is having a data or control bus 6 to which, according to the embodiment shown, a user control terminal 7, a task controller 8, and a plurality of electronic control units 9 are connected. Each of the electronic control units 9 is assigned to a functional element 10a, 10b provided in the tractor 1 and the implement 2, respectively. In an alternative embodiment, the electronic control units 9 connected to the user control terminal 7 through the data bus 6 may only be applied to the functional element(s) 10b of the implement 2, but not to the functional element(s) 10a of the tractor 1.

With regard to the implement 2, the functional elements 10b may also be referred to as working unit. Through the data bus 6 electronic data, such as control signals, may be transmitted between the components, units, modules or elements connected to the data bus 6. The electronic control system of the agricultural machine control network 3 may implement the ISO 11783 standard, preferably the ISO 11783-11 standard.

The data bus 6 may be implemented with a Controller Area Network (CAN bus) which is a multi-master serial bus standard for connecting Electronic Control Units (ECUs) also known as nodes. Each ECU is assigned to at least one of the functional elements 10a, 10b. Two or more nodes are required on the CAN network to communicate. The complexity of the node can range from a simple I/O device up to an embedded computer with a CAN interface and sophisticated software. The node may also be a gateway allowing a standard computer to communicate over a USB or Ethernet port to the devices on a CAN network. All nodes may be connected to each other through a two wire bus. The wires may be 120Ω nominal twisted pair. ISO 11898-2, also called high speed CAN, uses a linear bus terminated at each end with 120Ω resistors.

The data bus 6 is provided with a plug connector 11 connecting the tractor control network 4 and the implement control network 5.

The user or operator control terminal 7 is provided with a terminal display 12 which may comprise a touch sensitive display and provides for user control and user display. Further, the user control terminal 7 is provided with a processor unit comprising a processor and a memory element connected to the processor. Multiple software applications implemented on the user control terminal 7 may be running simultaneously.

Through the user control terminal 7 user input may be received for controlling the functional elements 10a, 10b of the agricultural machine or system. Also, through the terminal display 12 operation information may be displayed to the user.

A battery 13 is provided for power supply, for example, to the user control terminal 7. In general, the power provided by the battery and/or some other power supply source may be supplied to the components of the agricultural machine in need for any power supply during operation by a so-called central electronic unit (CEU) as it is known as such.

Figure 2:
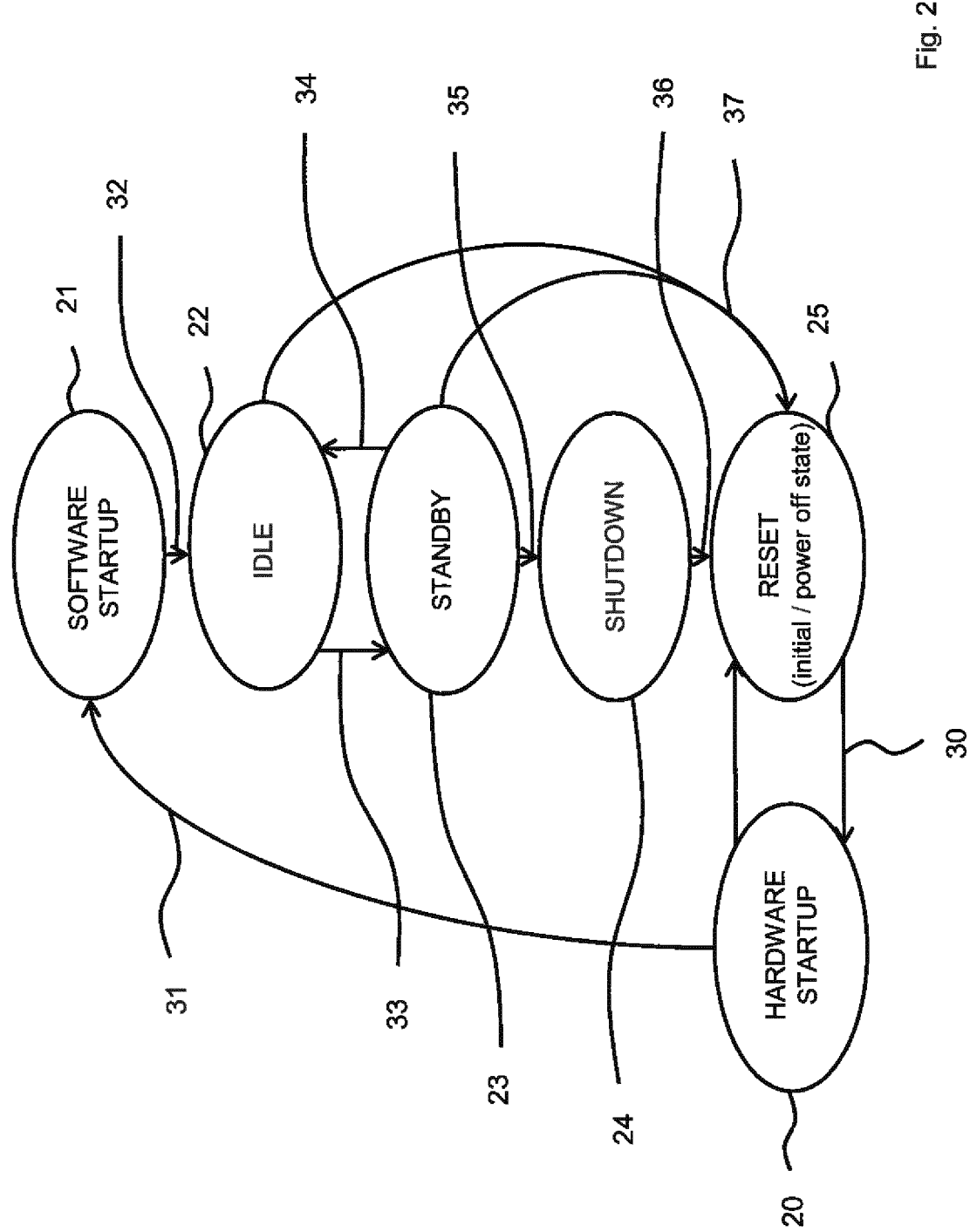
FIG. 2 a schematic representation for the operation of a user terminal in the control system.

FIG. 2 shows a schematic representation for operating the user control terminal 7. The mode of operation of the user control terminal 7 will depend on the state of an ignition device of the agricultural machine, specifically an ignition device of the tractor 1. The state of the ignition device, specifically a turn-on state and a turn-off state, will be determined by the agricultural machine control network 3.

The user control terminal 7 comprises hardware and software components each of which is assigned a hardware startup 20 and a software startup 21, respectively. If a turn-on state of the ignition device of the agricultural machine is determined (step 30), as part of a booting process, the hardware startup 20 is initiated which in turn will start the software startup 21 in step 31. Thereby, a control mode of operation (idle state or mode 22) is finally implemented for the user control terminal 7 (step 32).

The period of time between the turn-on of the ignition device and the enabling of the control mode of operation for the user control terminal 7 may be referred to starting time after the determining of the turn-on state for the ignition device. In the control mode of operation one or more software applications are running in the user control terminal 7. Also, the data bus 6 is enabled, thereby, operating the date bus 6 in bus control mode allowing for transmission of control signals through the data bus 6 to the functional elements 10*a*, 10*b* of the agricultural machine. A driving circuit configured to drive terminal elements of the user control terminal 7 is provided with a normal operation power.

If in step 33 a turn-off state is detected for the ignition device, a standby mode of operation 23 is implemented for the user control terminal 7, wherein the standby mode of operation 23 is implemented after the user control terminal 7 has been in the idle state or process 22 (control mode) before. In the standby mode of operation 23 the user control terminal 7 is provided with limited or reduced functionality. In an embodiment, in the standby mode of operation 23 the illumination of the terminal display 12 of the user control terminal 7 is turned off. For example, a backlight illumination of a liquid crystal display (LCD) device may be turned off. The enabling of the standby mode of operation for the user terminal 7 may comprise disabling an input device of the user terminal. For example, at least one of a touch sensitive input device provided on the terminal display 12 of the user terminal 7 and an external input device may be disabled, thereby, preventing user input.

Figure 3:
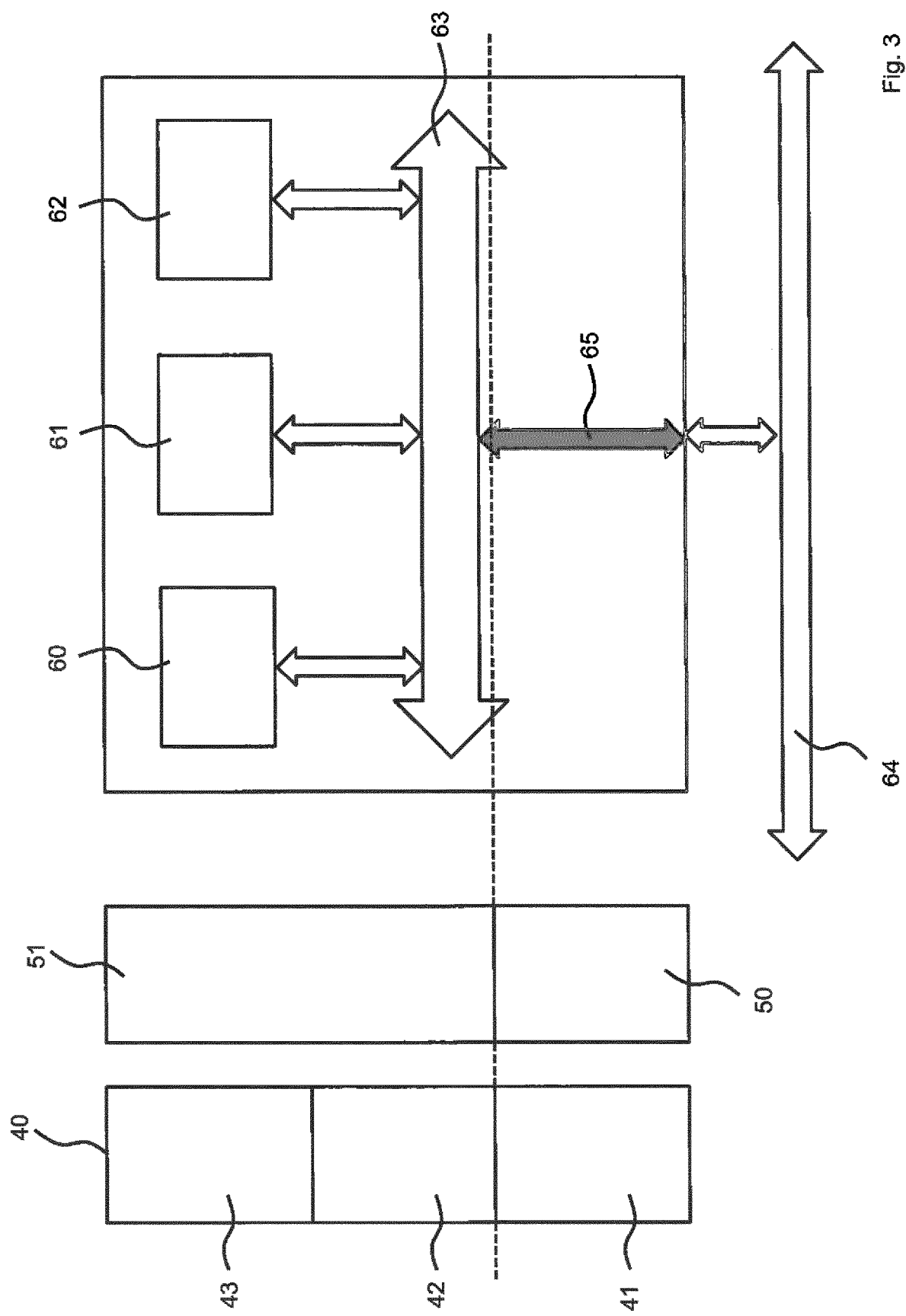
FIG. 3 a schematic representation of functional elements of the user terminal.

Also, the data bus 6 is disabled, thereby, preventing transmission of control signals through the data bus 6 to the functional elements 10*a*, 10*b*. Referring to FIG. 3, the disabling of the control bus 6 may comprise, within an OSI (Open System Interconnection) layer model 40 of the control bus 6, disabling control signal or message transmission between a physical layer 41 and a data link layer 42. The control bus 6 may be provided as a CAN bus (Controller Area Network protocol). In the example embodiment shown, the control bus 6, according to the OSI model 40, may be implemented with the physical layer 41, data link layer 42, and an application layer 43. The physical layer 41 may provide for basic hardware required for a control bus network, such as a CAN bus network, i.e. the ISO 11898 electrical specification. The data link layer 42 may be responsible for transferring messages/signals from a node to the network (without errors), such nodes comprising, for example, the user control terminal 7 and the ECUs assigned to at least one of the functional elements 10*a*, 10*b*. The application layer 43 may provide for upper-level communication functions of the OSI layer model 40. In general, although the other layers such as the data link layer 42 and the application layer 43 may be implemented by software and/or hardware, the physical layer 41 is implemented by hardware.

In the standby mode of operation for the user control terminal 7, by the disabling control signal transmission from the user control terminal 7 to one of the functional elements 10*a*, 10*b* is prevented. Specifically, the user is prevented from control input. Signal transmission between the functional elements 10*a*, 10*b* through the data bus 6 may still be enabled. In such alternative embodiments, nodes of the control system 3 connected to the data bus 6 other than the user control terminal 7 may be provided with the signal transmission functionality of the data bus 6.

Referring to FIG. 3, the physical 41, the data link layer 42, and the application layer 43 compare to a physical layer 50, and an object/transfer layer 51 in the CAN bus model (ISO 11898).

In the user control terminal 7 providing a node in the CAN bus network, software application 60, 61, 62 are implemented, such software application 60, 61, 62 being functionally connected to a socket CAN 63 (virtual CAN bus implemented by software). The socket CAN 63 is connected to CAN bus hardware 64 via a connection 65. Such connection 65 is disabled in the standby mode of operation of the user control terminal 7. For disabling, for example, software switches provided with hardware drivers may be switched off.

In the standby mode of operation 23, one or all of the software applications 60, 61, 62 implemented in the user control terminal 7 may continue to be running. For example, a task controller (e.g. ISO 11783-14) implemented as one of the software application may be kept running in the standby mode of operation. In addition or as an alternative, a virtual terminal also referred to as universal terminal (e.g. ISO 11783-6) may continue to run as a software application in the user control terminal 7 in the standby mode.

If in step 34 it is determined that the ignition device is turned on, the user control terminal 7 will return to the control mode of operation, thereby, enabling the idle state or process 22 (control mode of operation).

If it is determined that the user control terminal 7 has been operated in the standby mode of operation 23 longer than a standby time limit, which for example may be set to about 12 h, there is a shutdown 24 (step 35) which will require a reset 25 for re-starting (step 36).

In case of failure detection, the reset 25 may be started form the idle state 22 or the standby state 24 (step 37).

Table 1 provides summarized information on the operation of the user control terminal 7. The status of different elements of the user control terminal 7 depending on the state of operation is indicated. Specifically, reference is made to the screen of the terminal display 12, user input elements "Button", and backlight illumination "LEDs".

TABLE 1

| State | Power | Screen | Buttons | LEDs | Description |
| --- | --- | --- | --- | --- | --- |
| Hardware Startup (after user control terminal was tuned off) | Off | n/a | n/a | n/a | Hardware initialization, no state guarantees |
| Software Startup | Off | On | On | On | During terminal startup |
| Idle (control mode) | On | On | On | On | Control mode of operation |
| Standby mode | On | Off | Off | Off | With ignition turned off (standby mode of operation) |
| Shutdown (user control terminal turned off) | On | Previous/ black | On | On | During terminal shutdown |
| Reset | Off | Off | On | On | Between terminal shutdown and startup |

The level of voltage power applied in the control mode and the standby mode, respectively, will be different.

Figure 4:
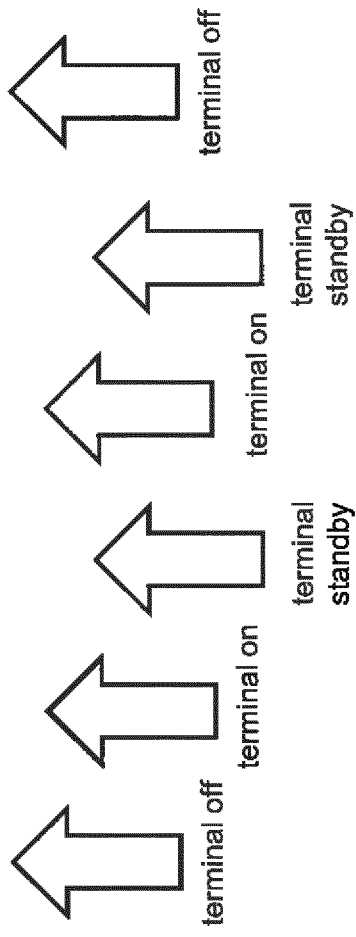
FIG. 4 a schematic representation of elements of a control bus provided in the control system.

FIG. 4 shows a schematic representation with regard to the mode of operation of the user control terminal 7 in dependence on the state of the ignition device. For example, "0" indicates for the ignition state that the ignition device is turned off. Contrary, "1" indicates that the ignition device is turned on. After the standby time limit of 12 h has lapsed, the user control terminal 7 is turned off. Thereby, the user control terminal 7 is returning to the turned-off state from which it is started according to the schematic representation in FIG. 3.

With regard to the operation of the agricultural machine control network 3, as an alternative or in addition to the operation of the user control terminal 7 in the different modes of operation, a voltage or power control mechanism may be applied. If the ignition device of the agricultural machine is turned on for starting an engine, a power level at which power is provided by the battery 13 will drop. For example, if a normal power or voltage level of about 12 V is provided, it may drop to about 2 to 3 V for the time of starting the engine by activating the ignition device.

Figure 5:
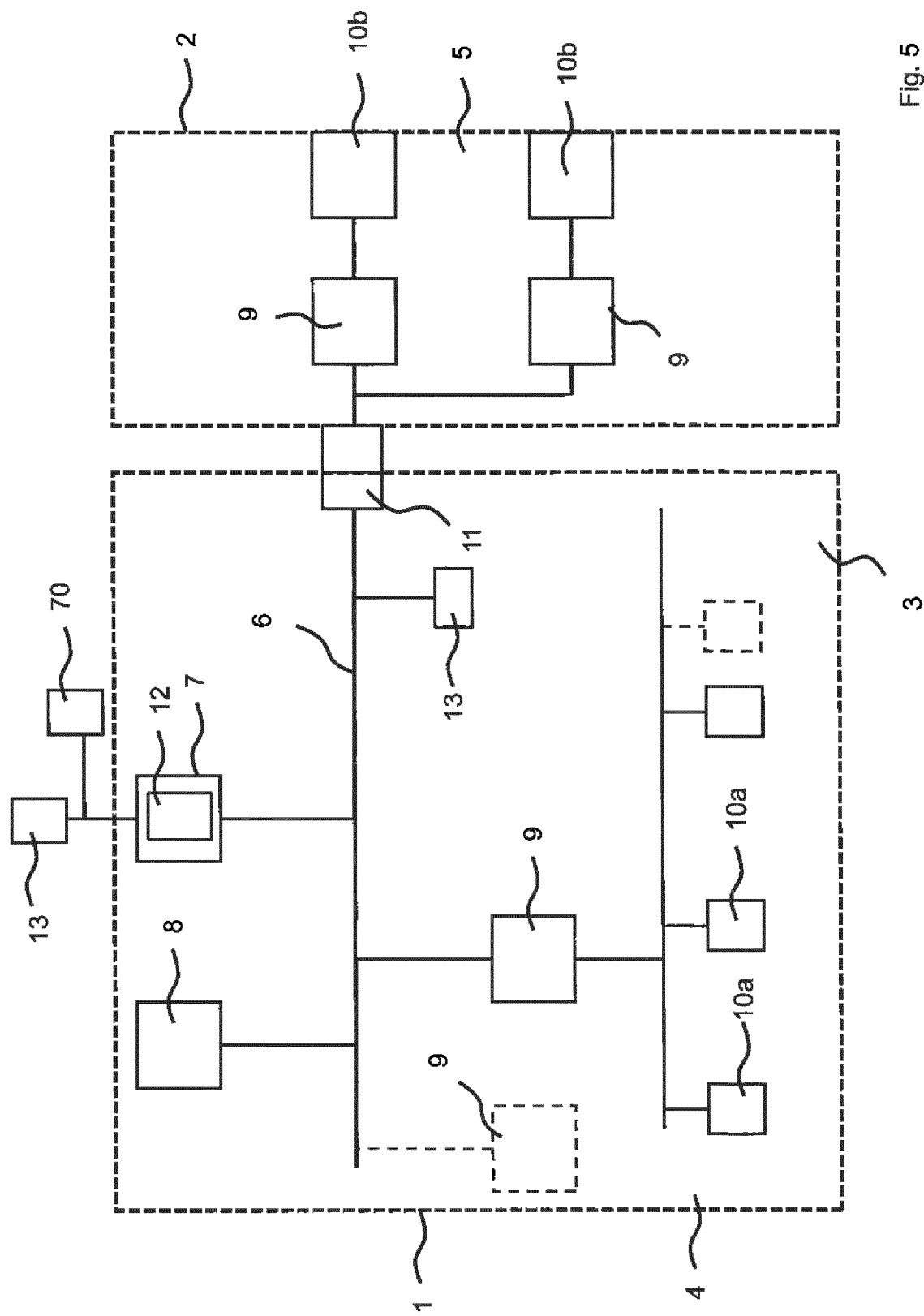
FIG. 5 a schematic representation of the time course of operation of the user terminal.

According to the embodiment shown in FIG. 5, a functional circuit 70 is provided which will upscale or boost the power level to the normal voltage level. Such upscaling will be limited to the time period the ignition device is activated. Specifically, the upscaled voltage (which is about the normal voltage level) will be provided to the user control terminal 7, thereby, preventing the power or voltage level applied to the user control terminal 7 to drop below a level which would cause a re-booting of the user control terminal 7. Functional circuit devices configured to upscale or boost voltage level are known as such with different hardware/software design. By the boosted voltage, for example, the standby mode of operation may be kept for the user control terminal 7, thereby, preventing completely restarting the user control terminal 7 by booting. Rather, the user control terminal 7 can switch from the standby mode of operation into the control mode of operation (directly) without re-booting caused by the voltage drop due to activation of the ignition device.

Figure 6:
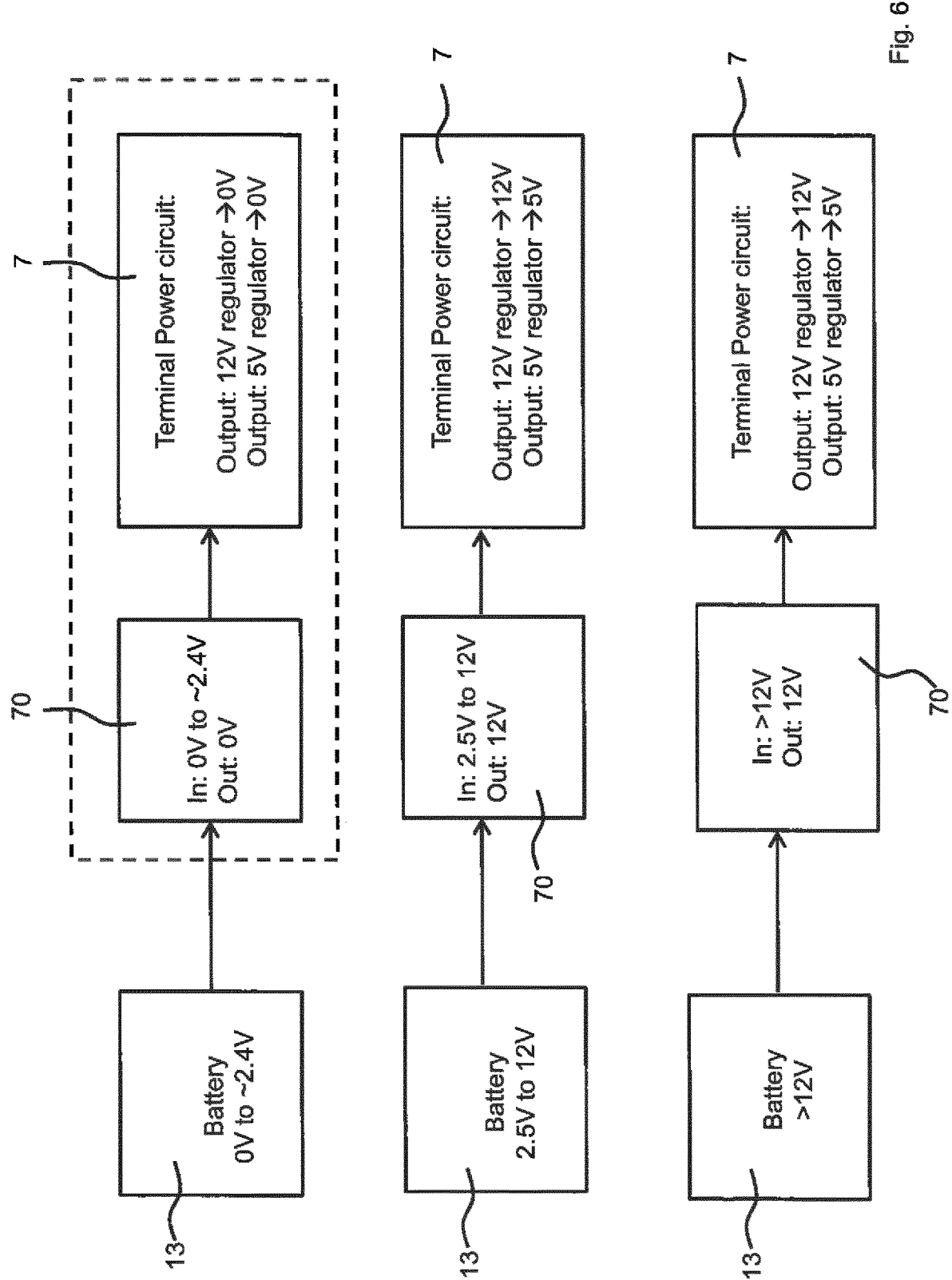
FIG. 6 a schematic representation of a control system of an agricultural machine or system provided with a tractor and an implement trailed by or carried on the tractor, wherein the power supply is provided with a functional device for voltage upscaling.

FIG. 6 shows a schematic representation of an example for operation of the power supply which uses the functional circuit 70 for voltage boosting or upscaling. The voltage output of the functional circuit 70, according to the embodiment shown, is applied to the user control terminal 7, but, in addition or as an alternative, may also be applied to other components of the agricultural machine.

If the power level provided by the battery 13 is higher than a required normal operation level, the functional circuit may be configured to still output voltage having the required normal operation level.

In an embodiment, the functional circuit 70 may be provided in the user control terminal 7 schematically indicated by the dashed line in FIG. 6.

The features disclosed in this specification, the figures and/or the claims may be material for the realization of various embodiments, taken in isolation or in various combinations thereof.

The invention claimed is:

1. Method for operating a user terminal (7) of an agricultural machine, comprising
   providing a user terminal (7) in a control system (3) of the agricultural machine, the user terminal (7) connected to a power supply and configured to transmit, through a control bus (6) provided with an OSI layer model, control signals to functional elements (10a; 10b) of the agricultural machine;
   enabling operation of the user terminal (7), after a period of time the user terminal was turned-off before, comprising
   enabling a user control mode of operation of the user terminal (7);
   running software applications in the user terminal (7);
   enabling a display device of the user terminal (7); and
   enabling the control bus (6), thereby, operating the control bus (6) in a bus control mode allowing for transmission of the control signals through the control bus (6);
   controlling operation of one of the functional elements (10a; 10b) of the agricultural machine in the user control mode of operation, comprising
   receiving a user input for controlling operation of the one of the functional elements (10a; 10b) through an input device of the user terminal (7);
   in response to the user input, generating present control signals;
   transmitting the present control signals to the control unit assigned to the one of the functional elements (10a; 10b) through the control bus (6); and
   operating the functional elements (10a; 10b) according to the present control signals;
   disabling the user control mode of operation and enabling a standby mode of operation for the user terminal (7), comprising
   continuing with running one or all of the software applications in the user terminal (7);
   disabling the display device of the user terminal (7); and
   disabling the control bus (6), thereby, preventing transmission of the control signals from the user terminal (7) through the control bus (6); and
   re-enabling the control mode of operation for the user terminal (7);
   determining a turn-on state of an ignition device of the agricultural machine in the control system (3);
   enabling operation of the user terminal (7);
   determining a turn-off state of the ignition device of the agricultural machine; and
   in response to the determining of the turn-off state, disabling the control mode of operation and enabling the standby mode of operation for the user terminal (7);
   wherein the disabling of the control bus (6) conducted when disabling the user control mode of operation and enabling a standby mode of operation for the user terminal (7) comprises, within the OSI layer model of the control bus (6),
   disabling transmission of control signals form a data link layer to a physical layer; and
   enabling signal transmission between the functional elements (10a; 10b) of the agricultural machine through the control bus (6).

2. Method of claim 1, further comprising wherein
   the enabling of operation comprises enabling of the operation of the user
   terminal (7) within a starting period of time after determining the turn-on state; and
   the re-enabling of the control mode of operation comprises re-enabling the control mode of operation for the user terminal (7) within a re-starting period of time after determining a re-turn-on state of the ignition device, the re-starting period of time being shorter than the starting period of time.

3. Method of claim 2, wherein the re-starting period of time is shorter than the starting period of time by at least 70%.

4. Method of claim 1, wherein the enabling of the standby mode of operation for the user terminal (7) comprises disabling an input device of the user terminal (7).

5. Method of claim 1, wherein the disabling of the control bus (6) comprises, within an OSI layer model of the control bus (6), disabling a physical layer.

6. Method of claim 1, wherein the disabling the display comprises one of outputting a standby screen on the display device of the user terminal (7); and turning-off a backlight illumination of the display device (12) of the user terminal (7).

7. Method of claim 1, further comprising, in the standby mode of operation,
   determining a standby time in the control system (3), the standby time indicating a period of time lapsed after the enabling of the standby mode of operation for the user terminal (7);
      determining a standby time in the control system (3), the standby time indicating a period of time lapsed after the enabling of the standby mode of operation for the user terminal (7);
      determining that the standby time is exceeding a standby time limit; and
      in response to the determining, turning-off the user terminal (7).

8. Method of claim 1, wherein the providing comprises providing the user terminal in a tractor (1) of the agricultural machine, the tractor (1) trailing or carrying an implement (2), wherein at least some of the functional elements (1 Ob) are provided on the implement (2).

9. An agricultural machine, comprising
   a control system (3);
   a user terminal (7) provided in the control system (3) and connected to a power supply (13);
   functional control elements (10a; 10b); and
   a control bus (6) provided in the control system (3) and configured to transmit control signals from the user terminal (7) to the functional elements (10a; 10b);
   wherein the user control system (3) is configured to operate the user terminal (7) according to a method of claim 1.

* * * * *